United States Patent
Yakshin et al.

(10) Patent No.: US 8,144,830 B2
(45) Date of Patent: Mar. 27, 2012

(54) REFLECTIVE OPTICAL ELEMENT FOR EUV LITHOGRAPHY DEVICE

(75) Inventors: Andrey E. Yakshin, Nieuwegein (NL); Robbert W. E. Van De Kruijs, Nieuwegein (NL); Fred Bijkerk, Bosch en Duin (NL); Eric Louis, Ijsselstein (NL); Ileana Nedelcu, Nieuwegein (NL)

(73) Assignee: Carl Zeiss GmbH, Oberkochen (DE)

( * ) Notice: Subject to any disclaimer, the term of this patent is extended or adjusted under 35 U.S.C. 154(b) by 0 days.

(21) Appl. No.: 12/536,251

(22) Filed: Aug. 5, 2009

(65) Prior Publication Data

US 2010/0027107 A1    Feb. 4, 2010

Related U.S. Application Data

(63) Continuation of application No. PCT/EP2008/000842, filed on Feb. 2, 2008.

(60) Provisional application No. 60/888,144, filed on Feb. 5, 2007.

(30) Foreign Application Priority Data

Feb. 5, 2007 (DE) .......... 10 2007 006 423

(51) Int. Cl.
*G21K 3/00* (2006.01)

(52) U.S. Cl. .......... 378/34; 359/360; 359/584; 359/585; 359/589

(58) Field of Classification Search .......... 359/359, 359/360, 580, 584–589; 378/34, 84, 204, 378/210
See application file for complete search history.

(56) References Cited

U.S. PATENT DOCUMENTS

| | | | | |
|---|---|---|---|---|
| 6,396,900 B1 * | 5/2002 | Barbee et al. | ............ | 378/84 |
| 6,441,963 B2 * | 8/2002 | Murakami et al. | ............ | 359/584 |
| 6,449,086 B1 * | 9/2002 | Singh | ............ | 359/361 |
| 6,763,086 B2 | 7/2004 | Platonov | | |
| 7,282,307 B2 * | 10/2007 | Hector et al. | ............ | 430/5 |
| 7,848,483 B2 * | 12/2010 | Platonov et al. | ............ | 378/49 |
| 2003/0008180 A1 * | 1/2003 | Bajt et al. | ............ | 428/698 |
| 2004/0121134 A1 * | 6/2004 | Bijkerk et al. | ............ | 428/212 |
| 2005/0213199 A1 * | 9/2005 | Imai et al. | ............ | 359/359 |
| 2005/0276988 A1 * | 12/2005 | Trenkler | ............ | 428/432 |

FOREIGN PATENT DOCUMENTS

| | | |
|---|---|---|
| DE | 103 60 540 A1 | 7/2005 |
| EP | 1 065 532 A2 | 1/2001 |
| EP | 1 394 815 A1 | 3/2004 |
| KR | 2007 0003521 A | 1/2007 |
| WO | 02/089149 A1 | 11/2002 |
| WO | 03/005377 A2 | 1/2003 |

* cited by examiner

*Primary Examiner* — Mark Consilvio
(74) *Attorney, Agent, or Firm* — Sughrue Mion, PLLC (57) ABSTRACT

A reflective optical element exhibits an increase in the maximum reflectivity at operating wavelengths in the extreme ultraviolet or soft x-ray wavelength range. A first additional intermediate layer (23a, 23b) and a second additional intermediate layer (24a, 24b) are provided between the absorber layer (22) and the spacer layer (21), wherein the first additional intermediate layer increases the reflectivity and the second additional intermediate layer (24a,b) prevents chemical interaction between the first additional intermediate layer (23a,b) and the adjoining spacer layer (21) and/or the absorber layer (22).

21 Claims, 6 Drawing Sheets

REFLECTIVE OPTICAL ELEMENT FOR EUV LITHOGRAPHY DEVICE

This is a Continuation of International Application PCT/EP2008/000842, with an international filing date of Feb. 2, 2008, which was published under PCT Article 21(2) in English, and the complete disclosure of which is incorporated into this application by reference.

FIELD OF THE INVENTION

The present invention relates to a reflective optical element for an operating wavelength in the extreme ultraviolet and soft x-ray wavelength range, in particular for use in EUV lithography devices, which has a multilayer system made of at least two alternating materials having different real parts of the index of refraction at the operating wavelength.

Furthermore, the present invention relates to a projection system and an illumination system, in particular for an EUV lithography device, having at least one reflective optical element and to an EUV lithography device having at least one reflective optical element.

BACKGROUND OF THE INVENTION

Reflective optical elements for the extreme ultraviolet (EUV) and soft x-ray wavelength range (e.g., wavelengths between approximately 1 nm and 20 nm) such as photomasks or multilayer mirrors, are used in particular in the lithography of semiconductor components. Because EUV lithography devices typically have multiple reflective optical elements, they must have the highest possible reflectivity to ensure a sufficiently high total reflectivity. Because typically multiple reflective optical elements are situated one behind another in an EUV lithography device, even small reflectivity losses at each individual reflective optical element have a greater effect on the total reflectivity.

Reflective optical elements for the EUV and soft x-ray wavelength range typically have multilayer systems. These are alternatingly applied layers of a material having a higher real part of the index of refraction at the operating wavelength (also called a spacer) and a material having a lower real part of the index of refraction at the operating wavelength (also called an absorber), an absorber-spacer pair forming a stack. A crystal is thus simulated in a certain way, whose lattice planes correspond to the absorber layers at which Bragg reflection occurs. The thicknesses of the individual layers and also of the repeating stack may be constant or also vary over the entire multilayer system, depending on which reflection profile is to be achieved.

One approach for ensuring the highest possible total reflectivities in EUV lithography devices is to provide reflective optical elements with a protective layer of one or more layers, to protect the reflective optical elements from contamination. The service life of the reflective optical elements is thus lengthened and a reflectivity loss over time is reduced.

A further approach supplements the basic structure made of absorber and spacer with further more and less absorbent materials to increase the maximum possible reflectivity at the particular operating wavelength. For this purpose, in many stacks, absorber and/or spacer materials may be exchanged with one another or the stack may be constructed from more than one absorber and/or spacer material. The absorber and spacer materials may have constant or also varying thicknesses over all stacks to optimize the reflectivity. In practice, higher reflectivities cannot be achieved to the expected extent in reflective optical elements having complex material sequences.

SUMMARY OF THE INVENTION

It is an object of the present invention to provide a reflective optical element which provides the highest possible reflectivity at its operating wavelength.

This object is achieved, in one formulation of the invention, by a reflective optical element for an operating wavelength in the soft x-ray and extreme ultraviolet wavelength range, e.g. for use in an EUV lithography device, which has a multilayer system with respective layers of at least two alternating materials having differing real parts of the index of refraction at the operating wavelength, and with at least two additional layers of further material each being situated adjoining at least one of the two alternating materials, in particular on at least one transition between the two alternating materials. The materials and/or further materials may include either identical or differing compositions, as described in greater detail below.

This object is achieved, in another formulation, by a corresponding reflective element, in which a first additional layer of a further material is situated on at least one transition between the two alternating materials, which results in an increase of the maximum reflectivity of the multilayer system at the operating wavelength compared to the reflectivity without the additional layer, and a second additional layer of another further material is situated on the transition, which acts as a barrier between the adjoining layers, with the first and second additional layer.

The basic structure of this multilayer system with the first and second additional layer is based on the finding that many materials which are capable of increasing the reflectivity react chemically with the basic materials of the multilayer system, in particular the spacer material, so that additional layers of undesired material form, which on one hand have a negative effect on the reflectivity because of their index of refraction at the operating wavelength, and, on the other hand, result in a shift of the phase angle of the electromagnetic wave in relation to the interfaces and thus in a reduction of the reflectivity at the operating wavelength due to spatial shift of the interfaces between absorber and spacer layers. Particularly in the EUV and soft x-ray wavelength range, metals are suitable as the absorber layer and nonmetals, which frequently react with metals, are suitable as the spacer layer. By simultaneously considering two intermediate layers, namely a reflection-enhancing intermediate layer and an intermediate layer which prevents chemical interaction and/or diffusion between the reflection-enhancing intermediate layer and the adjoining spacer or possibly also absorption layer like a barrier, the reflectivity of the starting multilayer system of real reflective optical elements made of the absorption and the spacer materials may be increased. Materials which do not significantly reduce the reflectivity gains from the first intermediate layer are especially preferred for the second intermediate layer, materials which result in an additional reflectivity gain are very especially preferred.

This object is further achieved, in yet another formulation, by a corresponding reflection element in which the two additional layers differ from one another at a transition from the material having a lower real part of the index of refraction to the material having a higher real part of the index of refraction than at a transition from the material having a higher real part of the index of refraction to the material having a lower real part of the index of refraction. It has been found that having different additional layers at different transitions leads to a higher reflectivity of the resulting multilayer system at the operating wavelength.

In reflective optical elements in which the multilayer system has a protective layer on the side which is subjected to the EUV or soft x-ray radiation in operation, a first additional layer of a further material is advantageously situated on the transition between multilayer system and protective coating, which results in an increase of the maximum reflectivity at the operating wavelength in comparison to the reflectivity without the additional layer, and a second additional layer of another further material is situated, which acts as a barrier between the adjoining layers.

Moreover, this object is achieved, in yet a further formulation, by a projection system, in particular for an EUV lithography device, having at least one such reflective optical element, by an illumination system, in particular for an EUV lithography device, having at least one such reflective optical element, and by an EUV lithography device having at least one such reflective optical element.

Advantageous embodiments are found in the dependent claims.

BRIEF DESCRIPTION OF THE FIGURES

The present invention will be explained in greater detail with reference to various exemplary embodiments.

DETAILED DESCRIPTION OF THE INVENTION

Figure 1A:
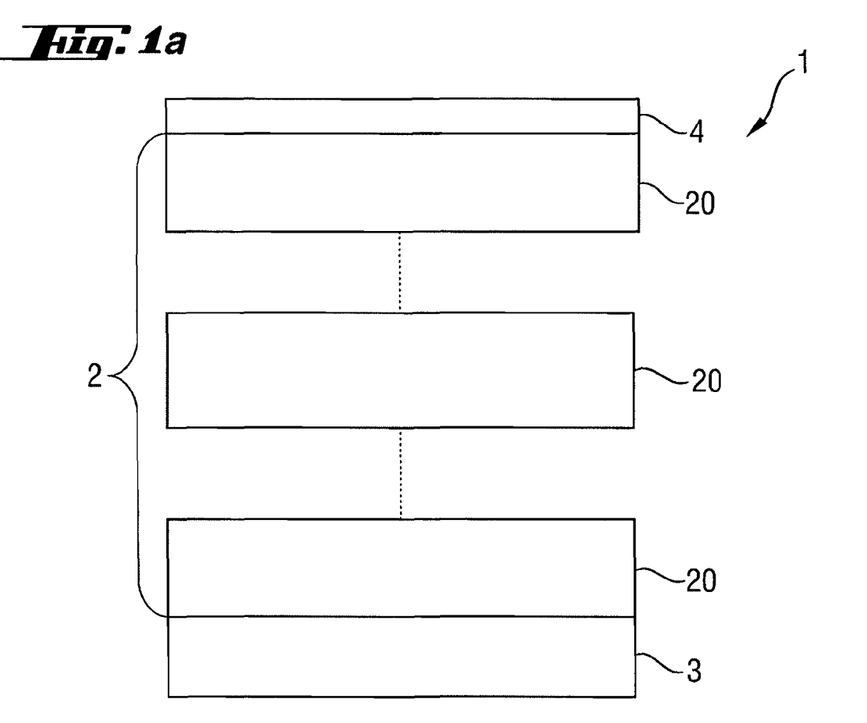
FIG. 1a shows a schematic illustration of a reflective optical element.
Figure 1B:
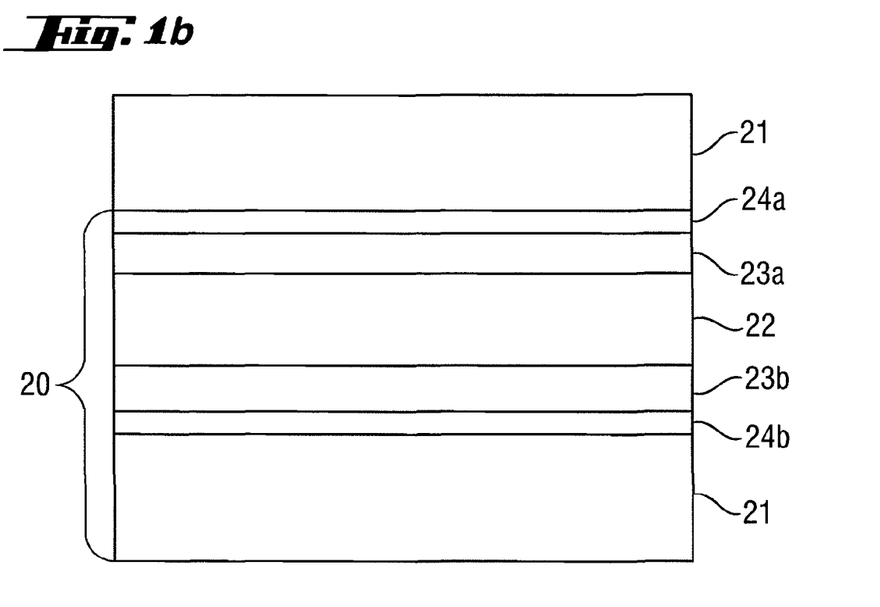
FIG. 1b shows a schematic detail illustration of the reflective optical element.

FIGS. 1a,b show an example of a reflective optical element 1 for the extreme ultraviolet and soft x-ray wavelength range, in particular for use in EUV lithography devices, e.g., as a photomask or as a mirror. FIG. 1a schematically shows the higher-order structure of the multilayer system 2. The multilayer system 2 has been produced in the present example by successively coating a substrate 3 using different materials having different complex indices of refraction. Moreover, a protective layer 4 was additionally applied to the multilayer system 2 for protection from external influences such as contamination. The protective layer 4 itself may be composed of multiple different material layers, which are inert to various contamination influences, suppress a chemical interaction with the multilayer system 2, and ensure an optical adaptation to the multilayer system 2, for example, to influence the optical properties such as the reflectivity of the reflective optical system 1 as little as possible.

The multilayer system 2 includes multiple repeating stacks 20, whose structure is schematically shown in FIG. 1b. The layers of a stack 20, which particularly result in reflection at an operating wavelength due to the multiple repetition of the stacks 20, are generally designated absorber layers 22 and are made of a material having a lower real part of the index of refraction and the so-called spacer layers 21 made of a material having a higher real part of the index of refraction. Thus, a crystal is in a way simulated, the absorber layers 22 corresponding to the lattice planes within the crystal, which have a distance to one another defined by the particular spacer layers 21 and at which reflection of incident EUV and/or soft x-ray radiation occurs. The thicknesses of the layers are selected such that at a specific operating wavelength, the radiation reflected at each absorber layer 22 constructively superimposes, to thus achieve maximum reflectivity of the reflective optical element. In the present example illustrated in FIG. 1b, a first intermediate layer 23a,b to increase the maximum reflectivity in relation to the basic reflectivity, which would result if only the spacer layers 21 and the absorber layers 22 were provided, i.e. the theoretically maximum possible reflectivity of the stack 20 is increased, is provided both at the interface between absorber layer 22 on spacer layer 21 and also at the interface between spacer layer 21 on absorber layer 22. A second intermediate layer 24a,b is provided, which acts as a barrier between the first intermediate layer 23a,b and, in the present example, of the adjoining spacer layer 21 against chemical interaction or diffusion, advantageously against both.

Figure 1C:
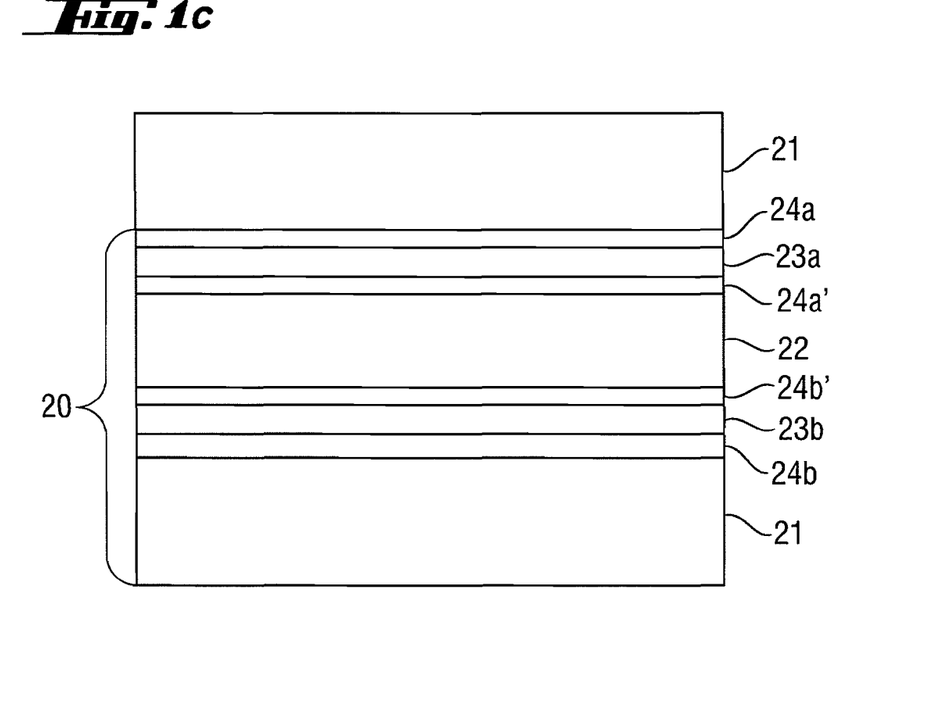
FIG. 1c shows a schematic detail illustration of a third embodiment of the reflective optical element.
Figure 1D:
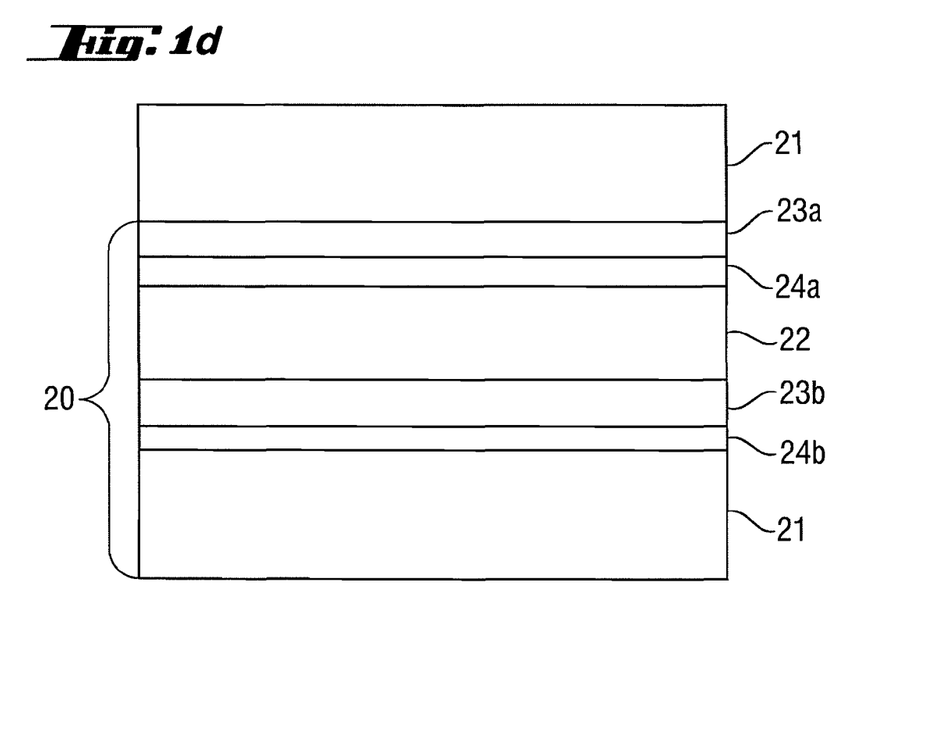
FIG. 1d shows a schematic detail illustration of a further embodiment of the reflective optical element.

It is to be noted that it is also possible to provide the two intermediate layers 23a,b, 24a,b at only one of the two interfaces between absorber layer 22 and spacer layer 21 or between spacer layer 21 and absorber layer 22. It is also possible to provide two second intermediate layers 24a,b on both sides of the first intermediate layer 23a,b to thus suppress a chemical interaction and/or diffusion both with the spacer layer 21 and also with the absorber layer 22, as is schematically illustrated in FIG. 1c. The second intermediate layers 24a, 24b, 24a', 24b' on either side of some first intermediate layers 23a, 23b may be different with respect to e.g. thickness and/or material. Depending on the material selection, it may only be necessary on the side of the absorber layer 22 to provide the second intermediate layer 24a,b. A further possibility includes having alternatingly the first intermediate layer on the absorber layer and the second intermediate layer on the spacer layer and vice-versa, as is schematically illustrated in FIG. 1d, thus inverting the sequence of the two additional layers depending on the transition being from absorber to spacer or from spacer to absorber layer. In particular, it is also possible to select different materials for the intermediate layers, depending on whether the intermediate layers are to be situated between absorber layer 22 and spacer layer 21 or between spacer layer 21 and absorber layer 22 leading to different intermediate layers, e.g. 23a and 23b or 24a and 24b, respectively. For each type of intermediate layer, more than two different materials can be chosen, in particular in stacks comprising more than two absorber layers and/or spacer layers. As appropriate, the intermediate layers have differing thicknesses depending on the transition being from absorber to spacer or from spacer to absorber layer.

Figure 1E:
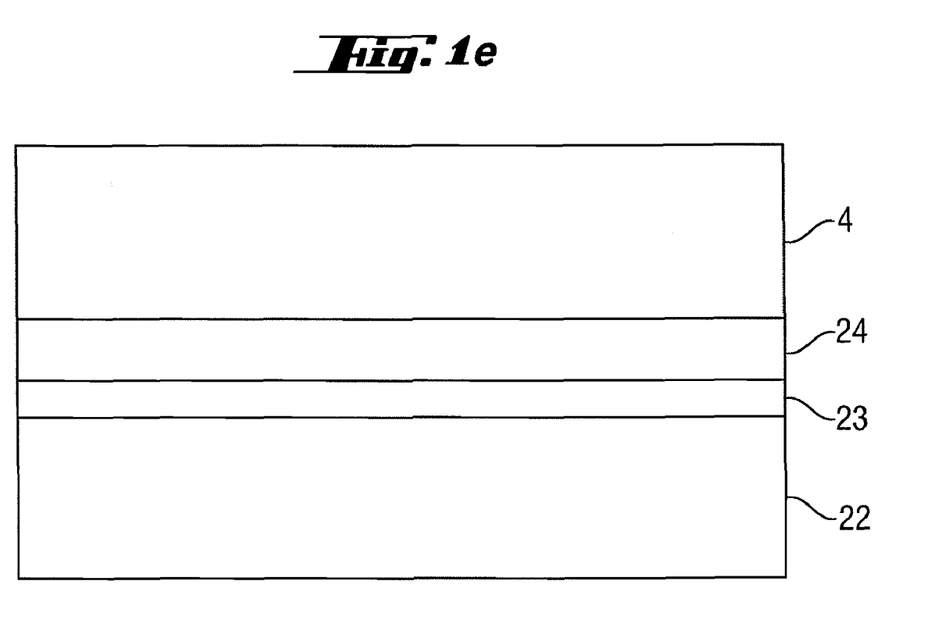
FIG. 1e shows a further schematic detail illustration of the reflective optical element.

The transition between multilayer system and protective coating is shown in detail in FIG. 1e, i.e., in the present example the transition of uppermost absorber layer 22 and protective layer 4. As already explained, the protective layer may be made of one material or assembled from multiple, i.e., two, three, four, or more layers. Preferred materials for the simple or assembled protective layer 4 are, for example, boron carbide, molybdenum boride, boron nitride, silicon nitride, silicon carbide, beryllium oxide, silicon oxide, titanium, titanium nitride, copper gold alloy, nickel, ruthenium, rhodium, iridium, gold, palladium, platinum, osmium, samarium, gadolinium, aluminum oxide, potassium, hafnium, thorium fluoride, natrium fluoride, lithium fluoride, magnesium fluoride, lanthanium fluoride, amorphous carbon, yttrium, niobium, rhodium oxide, ruthenium oxide, cerium, or silicon hydride. In the present example, a first intermediate layer 23 for increasing reflectivity and a second intermediate layer 24 as a barrier and in certain circumstances also for increasing reflectivity are situated between the uppermost absorber layer 22 and the protective layer 4. In the example shown in FIG. 1e, the first intermediate layer 23 is situated between the uppermost absorber layer 22 and the second intermediate layer 24. As needed, the second intermediate layer 24 may also be situated between the protective layer 4 and the first intermediate layer 23 or also on both sides of the first intermediate layer 23. Moreover, the multilayer system may also terminate with a spacer layer instead of with an absorber layer. First and second intermediate layers may then, too, be provided in the way described above at the transition to the protective layer to increase the reflectivity. In the dimensioning of the intermediate layers 23, 24 and the protective layer 4, the total thickness of the protective layer 4 is advantageously selected in a range between approximately 1 nm and approximately 10 nm and the total thickness of first and second intermediate layers 23, 24 is selected in a range between approximately 0.2 nm and approximately 10 nm. The materials for the first and second intermediate layers 23, 24 at the transition to the protective layer 4 may be identical to those for first and second intermediate layers 23a,b, 24a,b between the absorber and spacer layers 22, 21 or may also deviate therefrom. First and second intermediate layers may either be provided at the transition to the protective layer or within the multilayer system or also both at the transition to the protective layer and also within the multilayer system.

Some examples will be further explained on the basis of a stack with the materials molybdenum as absorber and silicon as spacer, which are often used in the EUV and soft x-ray wavelength range. The following statements may also be transferred similarly to other suitable multilayer systems for the EUV and soft x-ray wavelength range, such as molybdenum/beryllium, molybdenum carbide/silicon, or ruthenium/silicon. They may also be transferred to multilayer systems which are based on alternating layers made of more than two materials. Furthermore, it is to be noted that the at least two intermediate layers may be used in multilayer systems having both constant and also varying thickness ratios of the individual layers within a stack.

Figure 2A:
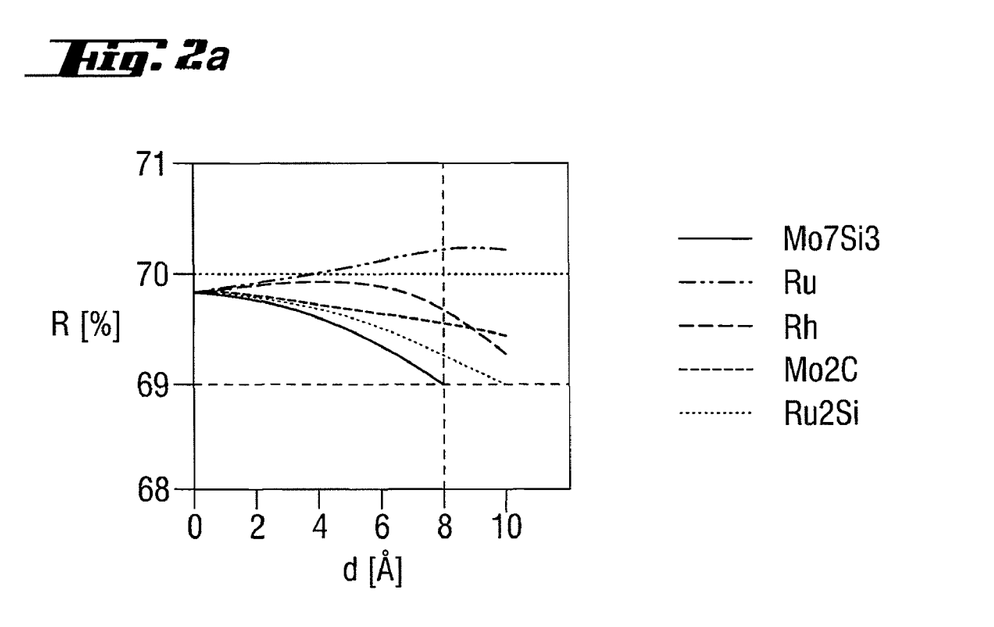
FIG. 2a shows the influence on the maximum reflectivity of different materials as the first additional layer on silicon.

Firstly, the interface of molybdenum on silicon will be examined in greater detail. The thickness dependency of the reflectivity of some possible materials for the first intermediate layer on silicon, i.e. the reflectivity enhancing layer, is shown in FIG. 2a, the thickness dependency of the reflectivity of some possible materials for the second intermediate layer on silicon, i.e. the barrier layer, is shown in FIG. 2b.

The solid line, which corresponds to a real Mo/Si multilayer system, is used as a comparison measure. A mixed layer, which may be approximately described by $Mo_7Si_3$ and typically has a thickness of 8 Å, i.e., 0.8 nm, forms by interdiffusion at the interface between the molybdenum and silicon layers in a real Mo/Li multilayer system. This mixed layer results in a reduction of the maximum reflectivity from just 70% to approximately 69%. In contrast, firstly the influence on the reflectivity of adding an intermediate layer made of ruthenium, rhodium, molybdenum carbide, and ruthenium silicide was studied as a function of the layer thickness. As may be seen from FIG. 2a, with increasing thickness, the reflectivity decreases with an intermediate layer made of molybdenum carbide or ruthenium silicide, but not a strongly as with the genuinely forming intermediate layer made of molybdenum silicide. With rhodium, a slight reflectivity increase may be seen at a thickness of up to approximately 6 Å, but the reflectivity sinks even more strongly at higher thicknesses. An astounding effect may be seen with ruthenium: up to a thickness of 8 Å, the reflectivity increases to above 70%, to then remain constant up to at least 10 Å. All of the materials shown here are fundamentally suitable as a material for the first intermediate layer, because they result in a real reflectivity gain in relation to the pure molybdenum-silicon multilayer system. Based on current observations, ruthenium is especially preferred as the material for the first intermediate layer.

Figure 2B:
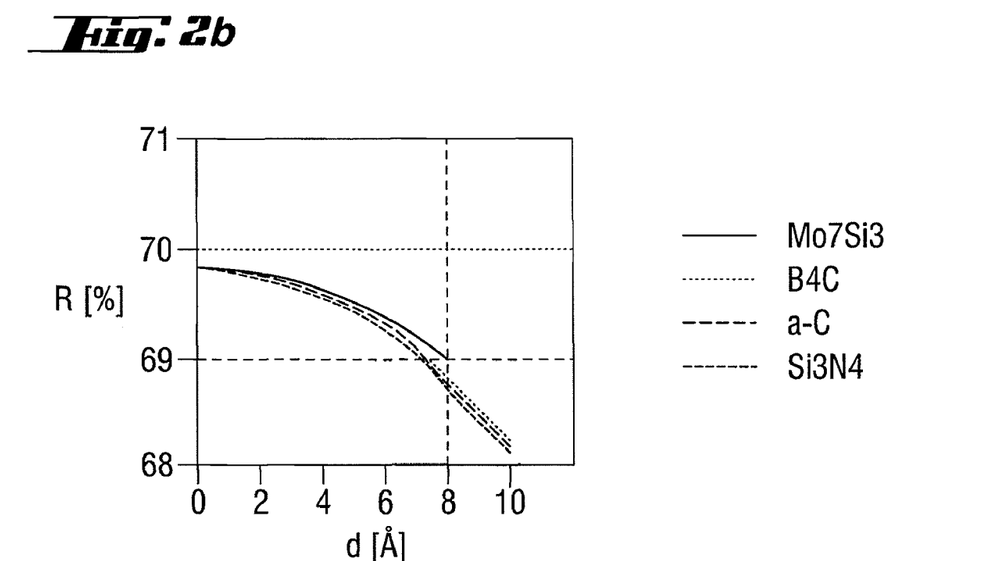
FIG. 2b shows the influence on the maximum reflectivity of different materials as the second additional layer on silicon.

Correspondingly, materials which are suitable for the second intermediate layer are shown in FIG. 2b. These are boron carbide, amorphous carbon, and silicon nitride, which are all known for being relatively chemically inert to silicon and also acting as a diffusion barrier. They only differ insignificantly at all thicknesses in their effect on the reflectivity and all result in a still acceptable reflectivity reduction in relation to the normal molybdenum-silicon multilayer system. It is to be noted that silicon carbide is also suitable as a material for the second intermediate layer at the interface molybdenum-on-silicon. It is comparable in its effect on the reflectivity to the materials boron carbide, amorphous carbon, and silicon nitride shown in FIG. 2b.

Figure 3A:
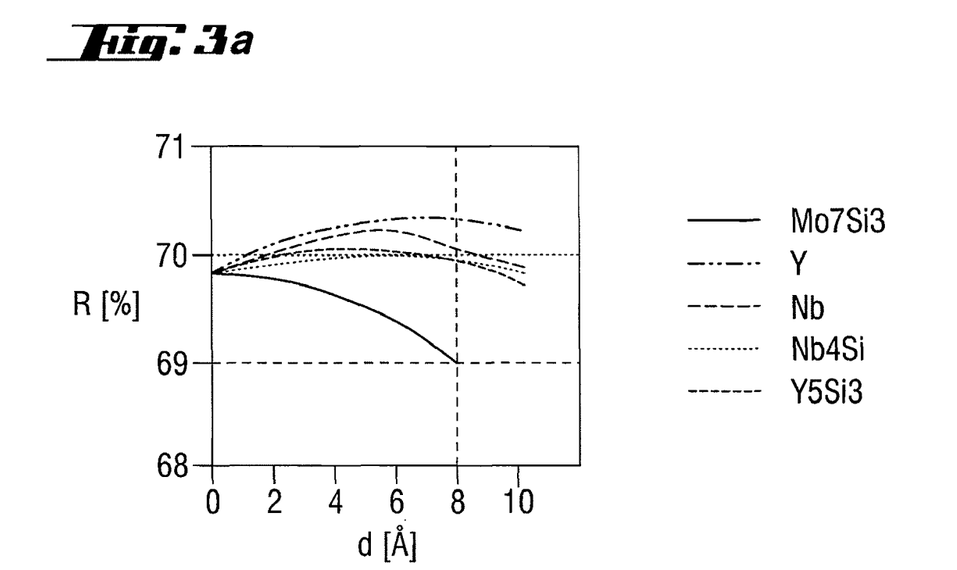
FIG. 3a shows the influence on the maximum reflectivity of different materials as the first additional layer on molybdenum.

For the interface silicon-on-molybdenum, it has been found that different materials suggest themselves for the reflectivity increase than for the interface molybdenum-on-silicon. In particular yttrium, niobium, niobium silicide, and yttrium silicide were studied in regard to their influence on the maximum reflectivity at the interface silicon on molybdenum. The results are shown in FIG. 3a. All four materials first display an increase of the reflectivity up to maximum of 70% or more and then a drop of the reflectivity. The maximum is already at 4 Å for yttrium silicide, and approximately 6 Å for niobium and niobium silicide, and only shortly before 8 Å for yttrium. The maximum reflectivity is also above 70% at 10 Å. Therefore, based on present observations, yttrium is especially preferred as the material for the first intermediate layer.

Figure 3B:
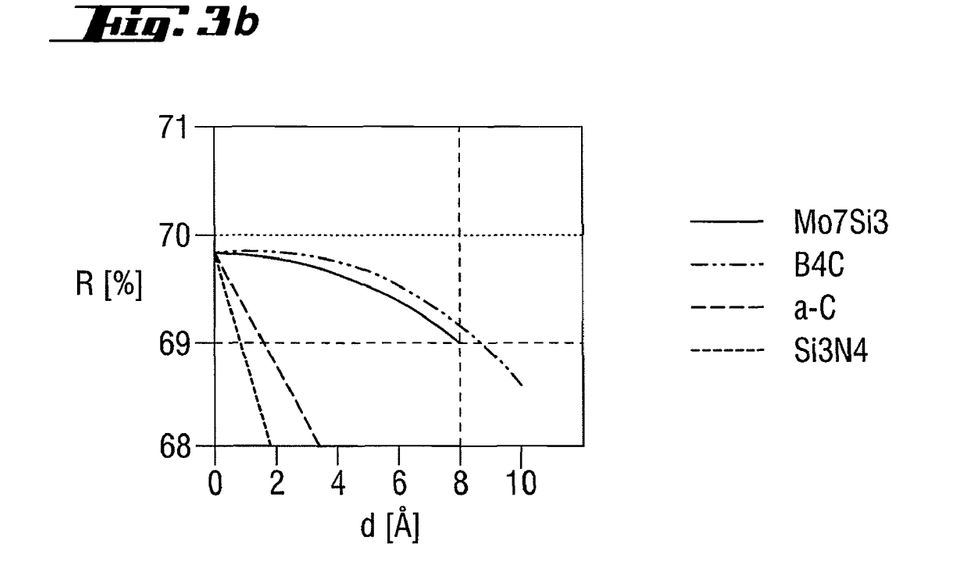
FIG. 3b shows the influence on the maximum reflectivity of different materials as the second additional layer on molybdenum.

Boron carbide, amorphous carbon, and silicon nitride were again studied as materials for the second intermediate layer. In contrast to the interface of molybdenum on silicon, intermediate layers made of amorphous carbon and silicon nitride already have a very negative influence on the reflectivity at very low thicknesses at the interface of silicon on molybdenum (see FIG. 3b), while boron carbide results in a slight increase of the reflectivity in relation to the molybdenum/silicon multilayer system having a genuine molybdenum silicide layer for all studied thicknesses. Boron carbide is thus presently preferred as the material for the second intermediate layer at least at the interface silicon-on-molybdenum.

Upon more precise observation of the properties of the materials which result in an increase of the maximum relative reflectivity of a multilayer system at an operating wavelength in the EUV and/or soft x-ray wavelength range in relation to a multilayer system without intermediate layers, e.g. a molybdenum/silicon multilayer system, one establishes two variants in particular. This is true in particular for the intermediate layer materials which result in a rise of the reflectivity not only in relation to a real molybdenum/silicon multilayer system having a mixed layer, but rather also in relation to an ideal molybdenum/silicon multilayer system (corresponds to the reflectivity at d=0 Å in FIGS. 2*a*,*b*, 3*a*,*b*).

In a first variant, at least the material of the first additional layer 23*a*,*b*, i.e. the reflectivity enhancing layer, has an index of refraction whose value of the real part of the index of refraction at the operating wavelength is either greater than the corresponding value of the alternating material having the higher real part of the index of refraction or is lower than the corresponding value of the alternating material having the lower real part of the index of refraction. The optical contrast within the multilayer system is thus increased and thus also the reflectivity. For example, in the case observed here of a molybdenum/silicon multilayer system, ruthenium is suitable as the material of the first additional layer 23*a* above a silicon layer and below a molybdenum layer, which has a significantly lower real part of the index of refraction at the operating wavelength of 13.5 nm here than molybdenum (see also Table 1). For the selection of the thickness of the first additional layer it is to be ensured that it is not selected as so high that the effect of the reflectivity gain is compensated for because of the higher optical contrast due to the additional absorption because of the first additional layer. This is important in particular with materials having a high imaginary part of the index of refraction at the operating wavelength such as ruthenium (see also Table 1).

In a second variant, at least the material of the first additional layer has an index of refraction whose value of the real part of the index of refraction at the operating wavelength is between the corresponding values of the alternating materials. Such a material does tend to reduce the optical contrast of the multilayer system. However, it results in a shift of the standing wave of the electrical field which forms upon irradiation of the multilayer system by refraction at the individual layer boundaries and interference. The standing wave field has a total absorption which is primarily influenced by the overall distribution of the intensities in the various layers in connection with the individual absorptions of the layers because of their particular materials, which are determined by the imaginary part of their indices of refraction. By incorporating the additional layer, the distributions of the intensities shift, so that another total absorption of the standing wave field results. As a special case, the position of the extremes and the nodes are shifted by additional layers made of material whose value of the real part of the index of refraction at the operating wavelength is between the corresponding values of the alternating materials in such a way that the maxima are shifted out of areas made of material having a relatively high imaginary part of the index of refraction, i.e., higher absorption, into areas made of material having a relatively low imaginary part of the index of refraction, i.e., lower absorption. The absorption thus reduced results in an increased reflectivity. It is to be noted that the suitable materials for the additional layers in the suitable thickness range are to be ascertained again for every multilayer system, because too large or too small a shift of the standing wave field may also result in an increase of the total absorption and reduction of the reflectivity. In the example described here of a molybdenum/silicon multilayer system, for example, yttrium and niobium are particularly suitable as the material for the first additional layer above a molybdenum layer and below a silicon layer.

Materials that are suitable as second intermediate layer, i.e. as barrier layer, often show a low enthalpy of formation with respect to the adjacent material, in the present case the material of the first intermediate layer and the spacer and/or the absorber layer. They often show a low diffusion rate with respect to the adjacent material. Besides, they often show a tendency to grow layers as closed atomic layers in opposite to an insular growth pattern. Preferably, the material of the second intermediate layer has appropriate optical constants at the operating wavelength, as explained before in relation with the material for the first intermediate layer.

It is to be noted that the materials cited in regard to the present example for the first or second intermediate layers are also suitable for corresponding intermediate layers at the transition to a protective layer.

The thicknesses of the intermediate layers are preferably less than those of the layers made of the alternating materials which are used as spacer and absorber layers and which define the basic characteristics of the reflective optical element, in particular the operating wavelength range. The thickness of the additional layers is especially preferably less than one fourth of the operating wavelength, in particular less than one eighth of the operating wavelength.

For example, for an operating wavelength of 13.5 nm, a molybdenum-silicon multilayer system having yttrium as the first intermediate layer 23*a* at the silicon-on-molybdenum interface and boron carbide as the second intermediate layer 24*a* toward the silicon layer 21 as well as ruthenium as the first intermediate layer 23*b* on the molybdenum-on-silicon interface and boron carbide again as the second intermediate layer 24*b* toward the silicon layer was produced. All layers were applied by electron beam vapor deposition. The individual layer thicknesses were approximately 2.8 nm for molybdenum, 0.6 nm for yttrium, 0.2 nm for both boron carbide layers, 4.2 nm for silicon, and 0.8 nm for ruthenium. This arrangement included fifty stacks 20. An actual achievable percent maximum reflectivity of somewhat above 71% resulted at the operating wavelength of 13.5 nm. This inventive arrangement corresponds to an increase of more than 2% compared to the 69% which may actually be achieved by a comparable molybdenum-silicon multilayer system without the intermediate layers.

For a further example, the reflective optical element just described was produced in that the boron carbide intermediate layers were applied not by electron beam vapor deposition, but rather by magnetron sputtering. In this case as well, a maximum percent reflectivity of somewhat over 71% resulted at an operating wavelength of 13.5 nm.

In addition, a further reflective optical element was produced, in which all individual layers were again applied by electron beam vapor deposition. Yttrium was replaced here by niobium as the material for the first intermediate layer at the interface silicon on molybdenum. A maximum percent reflectivity of approximately 71% was achieved at 13.5 nm by this reflective optical element.

Reflective optical elements in accordance with the present invention have the further advantage, in addition to their high actually achievable reflectivity, that the structure of their multilayer system also remains stable over longer usage times due to the second intermediate layers in particular. This is because the second intermediate layers prevent interdiffusion with the layers adjoining them also under thermal strain by continuous irradiation with EUV or soft x-ray radiation. The maximum reflectivity at the operating wavelength is thus maintained even in continuous operation. This makes reflective optical elements according to the present invention particularly suitable for use in EUV lithography devices, in which they may be used at diverse locations and in various capacities, as mirror elements or mask elements, for example.

Figure 4:
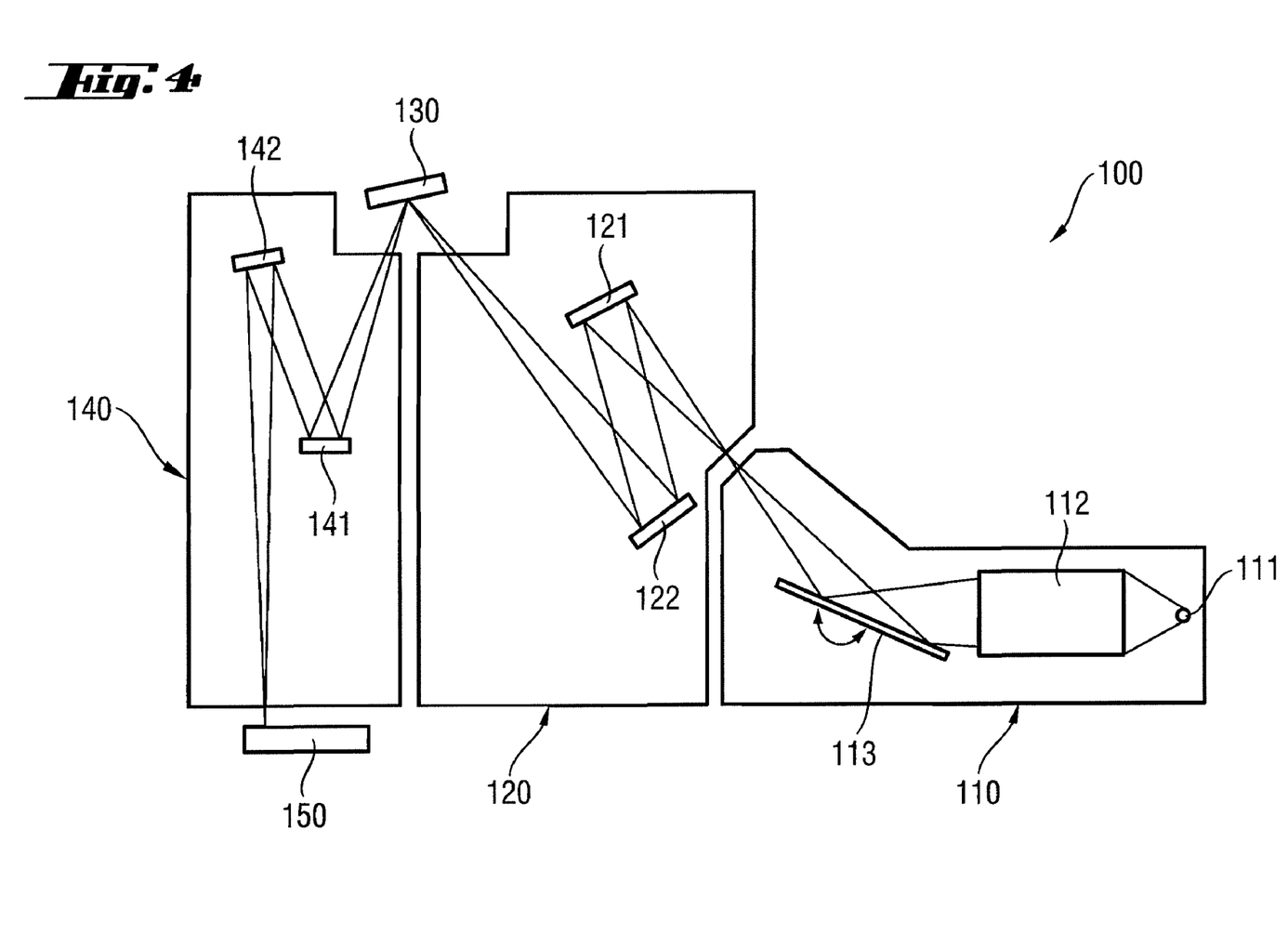
FIG. 4 shows a schematic illustration of an EUV lithography device.

An EUV lithography device 100 is schematically illustrated in FIG. 4 and includes the beam shaping system 110, the illumination system 120, the photomask 130, and the projection system 140.

For example, a plasma source or also a synchrotron may be used as the radiation source 111. The exiting radiation in the wavelength range of approximately 5 nm to 20 nm is first bundled in the collimator 112. In addition, with the aid of a monochromator 113, the desired operating wavelength is filtered out by varying the angle of incidence. The collimator 112 and the monochromator 113 are typically implemented as reflective optical elements in the cited wavelength range. The use of reflective elements in accordance with the present invention, for example, as the collimator 112 or as the monochromator 113, is advisable particularly in the beam shaping system 110. This is because the thermal strain is especially high here and it is especially important to provide a maximum of EUV radiation by high reflectivity of the following parts.

The operating beam, which is prepared in regard to wavelength and spatial distribution in the beam shaping system 110, is then introduced into the illumination system 120. In the example shown in FIG. 4, the illumination system 120 has two mirrors 121, 122, which both have multilayer systems having first and second intermediate layers as previously explained. It is to be noted that the illumination system 120 may also have as few as one mirror or as many as three, four, five, or more mirrors, which may all or partially have a multilayer system having first and second intermediate layers as previously explained.

The mirrors 121, 122 conduct the beam to the photomask 130, which has the structure which is to be imaged on the wafer 150. The photomask 130 is also a reflective optical element for the EUV and soft x-ray wavelength range having a multilayer system having first and second intermediate layers.

With the aid of the projection system 140, the beam reflected by the photomask 130 is projected on the wafer 150 and the structure of the photomask 130 is thus imaged thereon. The projection system 140 has two mirrors 141, 142 having a multilayer system having first and second intermediate layers in the illustrated example. It is to be noted that the projection system 140 may also have as few as one mirror or as many as three, four, five, or more mirrors, one or more mirrors of which may have a multilayer system having first and second intermediate layers.

The above description of exemplary embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

TABLE 1

Index of refraction at a wavelength of 13.5 nm

| Name | Real part | Imaginary part |
|---|---|---|
| Mo | 0.923793525 | 0.006435425 |
| Mo2C | 0.917767145 | 0.007945986 |
| Ru | 0.886360034 | 0.017064894 |
| Rh | 0.875048831 | 0.031177852 |
| Ru2Si | 0.899574861 | 0.016169887 |
| Si | 0.999002305 | 0.001826494 |
| Y | 0.973729959 | 0.002281516 |
| Nb | 0.933749691 | 0.005195933 |
| Nb4Si | 0.938146889 | 0.005302884 |
| Y5Si3 | 0.977611721 | 0.002474689 |
| B4C | 0.963771485 | 0.005145842 |
| C | 0.961573470 | 0.006905315 |
| Si3Ni4 | 0.973136209 | 0.009317771 |
| Mo7Si | 0.926676892 | 0.006498690 |

The invention claimed is:

1. A reflective optical element configured for an operating wavelength in at least one of the soft x-ray and extreme ultraviolet wavelength range, comprising:
a multilayer system comprising:
at least two alternating layers of respective materials having differing real parts of the index of refraction at the operating wavelength, and
at least two additional layers of further material, the at least two additional layers adjoining each other, and situated adjoining at least one of the two alternating layers,
wherein the two additional layers differ respectively at a transition from the layer having a lower real part of the index of refraction to the layer having a higher real part of the index of refraction and at a transition from the layer having a higher real part of the index of refraction to the layer having a lower real part of the index of refraction.

2. The reflective optical element according to claim 1, wherein a material of at least one of the two additional layers at a transition from the layer having the lower real part of the index of refraction to the layer having the higher real part of the index of refraction differs from a material of at least another of the two additional layers at a transition from the layer having the higher real part of the index of refraction to the layer having the lower real part of the index of refraction.

3. The reflective optical element according to claim 1, further comprising a protective coating being applied to the multilayer system, wherein a first additional layer of an additional material is situated at a transition between the multilayer system and the protective coating, which results in an increase of the maximum reflectivity of the transition between the multilayer system and the protective coating at the operating wavelength in comparison to the reflectivity without the additional layer, and a second additional layer of another additional material is situated at the transition between the multilayer system and the protective coating, which acts as a barrier between the adjoining layers.

4. The reflective optical element according to claim 1, wherein a thickness of the additional layers is less than a thickness of the alternating layers.

5. The reflective optical element according to claim 1, wherein a thickness of the additional layers is less than one fourth of the operating wavelength.

6. The reflective optical element according to claim 1, wherein a thickness of the additional layers is less than one eighth of the operating wavelength.

7. The reflective optical element according to claim 1, wherein the material having the lower real part of the index of refraction at the operating wavelength is molybdenum and the material having the higher real part of the index of refraction at the operating wavelength is silicon.

8. The reflective optical element according to claim 1, wherein the first additional layer comprises a material selected from the group consisting of ruthenium, rhodium, yttrium, and niobium.

9. The reflective optical element according to claim 1, wherein the second additional layer comprises boron carbide.

10. A projection system having at least one reflective optical element according to claim 1.

11. An illumination system having at least one reflective optical element according to claim 1.

12. An EUV lithography device having at least one reflective optical element according to claim 1.

13. A reflective optical element configured for an operating wavelength in at least one of the soft x-ray and extreme ultraviolet wavelength range, comprising:
a multilayer system comprising:
at least two alternating layers of respective materials having differing real parts of the index of refraction at the operating wavelength, and
at least two additional layers of further material situated adjoining at least one of the two alternating layers,
wherein the two additional layers differ respectively at a transition from the layer having a lower real part of the index of refraction to the layer having a higher real part of the index of refraction and at a transition from the layer having a higher real part of the index of refraction to the layer having a lower real part of the index of refraction; and
wherein a sequence of the two additional layers at a transition from the layer having the lower real part of the index of refraction to the layer having the higher real part of the index of refraction differs from a sequence of the two additional layers at a transition from the layer having the higher real part of the index of refraction to the layer having the lower real part of the index of refraction.

14. A reflective optical element configured for an operating wavelength in at least one of the soft x-ray and extreme ultraviolet wavelength range, comprising:
a multilayer system comprising:
at least two alternating layers of respective materials having differing real parts of the index of refraction at the operating wavelength, and
at least two additional layers of further material situated adjoining at least one of the two alternating layers,
wherein the two additional layers differ respectively at a transition from the layer having a lower real part of the index of refraction to the layer having a higher real part of the index of refraction and at a transition from the layer having a higher real part of the index of refraction to the layer having a lower real part of the index of refraction; and
wherein a first of the at least two additional layers of a further material is situated on at least one transition between the two alternating layers, which results in an increase of the maximum reflectivity of the multilayer system at the operating wavelength in comparison to the reflectivity without the additional layer, and a second of the at least two additional layers of another further material is situated on the at least one transition, which acts as a barrier between the adjoining layers.

15. A reflective optical element configured for an operating wavelength in at least one of the soft x-ray and extreme ultraviolet wavelength range, comprising:
a multilayer system comprising:
at least two alternating layers of respective materials having differing real parts of the index of refraction at the operating wavelength, and
at least two additional layers of further respective materials situated adjoining at least one of the two alternating materials,
wherein a first of the additional layers of a first of the further materials is situated on at least one transition between the two alternating layers, which results in an increase of the maximum reflectivity of the multilayer system at the operating wavelength in comparison to the reflectivity without the additional layer, and a second of the additional layers of a second of the further materials is situated on the at least one transition, which acts as a barrier between the adjoining layers.

16. The reflective optical element according to claim 15, wherein a composition of the first of the further materials of the first additional layer at a transition from the layer having the lower real part of the index of refraction to the layer having the higher real part of the index of refraction differs from a composition of the first of the further materials of the first additional layer at a transition from the layer having the higher real part of the index of refraction to the layer having the lower real part of the index of refraction.

17. The reflective optical element according to claim 15, further comprising a protective coating being applied to the multilayer system, wherein a first of the at least two additional layers of an additional material is situated at a transition between the multilayer system and the protective coating, which results in an increase of the maximum reflectivity of the multilayer system at the operating wavelength in comparison to the reflectivity without the additional layer, and a second of the at least two additional layer of another additional material is situated at the transition between the multilayer system and the protective coating, which acts as a barrier between the adjoining layers.

18. The reflective optical element according to claim 15, wherein the material of the second additional layer also results in a higher maximum reflectivity at the operating wavelength in comparison to the reflectivity without the additional layer.

19. The reflective optical element according to claim 15, wherein at least the material of the first additional layer has an index of refraction whose value of the real part of the index of refraction at the operating wavelength is either greater than the corresponding value of the alternating layer having the higher real part of the index of refraction or is lower than the corresponding value of the alternating layer having the lower real part of the index of refraction.

20. The reflective optical element according to claim 15, wherein at least the material of the first additional layer has an index of refraction whose value of the real part of the index of refraction at the operating wavelength is between the corresponding values of the alternating layers.

21. The reflective optical element according to claim 15, wherein a thickness of the additional layers is less than a thickness of the layers made of the alternating layers.

* * * * *

UNITED STATES PATENT AND TRADEMARK OFFICE
CERTIFICATE OF CORRECTION

| | | |
|---|---|---|
| PATENT NO. | : 8,144,830 B2 | Page 1 of 1 |
| APPLICATION NO. | : 12/536251 | |
| DATED | : March 27, 2012 | |
| INVENTOR(S) | : Andrey E. Yakshin et al. | |

It is certified that error appears in the above-identified patent and that said Letters Patent is hereby corrected as shown below:

Cover Page, Column 1, after "(73) Assignee": delete "Carl Zeiss GmbH," and insert -- Carl Zeiss SMT GmbH, --

Cover Page, Column 2, Line 7 of the Abstract: delete "layer" and insert -- layer (23a, b) --

Column 5, Line 9: delete "lanthanium" and insert -- lanthanum --

Column 5, Line 65: delete "Mo/Li" and insert -- Mo/Si --

Column 6, Line 6: delete "not a strongly" and insert -- not as strongly --

Column 12, Line 37: delete "additional layer" and insert -- additional layers --

Signed and Sealed this
Fifteenth Day of January, 2013

David J. Kappos
*Director of the United States Patent and Trademark Office*